J. R. DONNENWORTH.
CULTIVATOR.
APPLICATION FILED APR. 28, 1908.
917,720.
Patented Apr. 6, 1909.
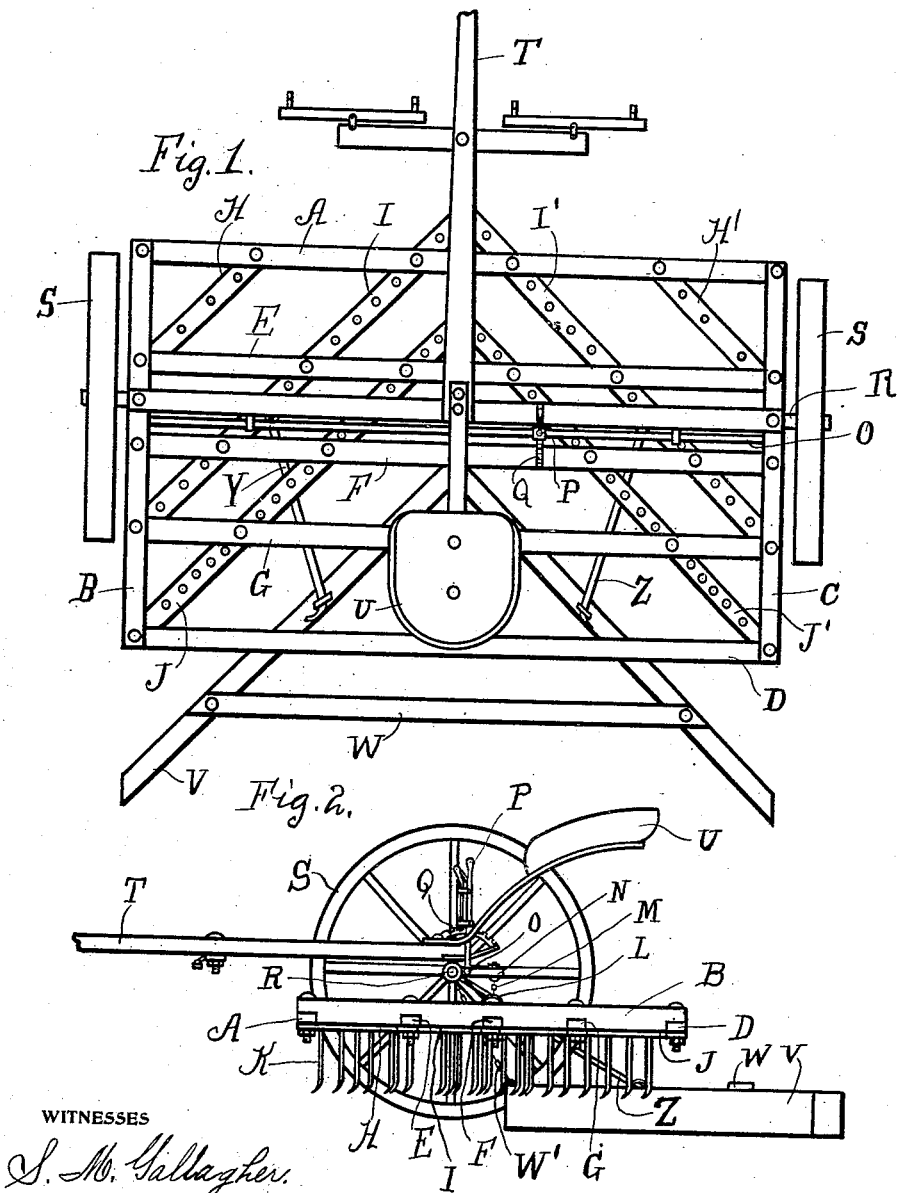
WITNESSES
S. M. Gallagher
E. N. Schofield
INVENTOR
Jacob R. Donnenworth
BY
ATTORNEY

UNITED STATES PATENT OFFICE.

JACOB R. DONNENWORTH, OF LACOMBE, ALBERTA, CANADA.

CULTIVATOR.

No. 917,720.  Specification of Letters Patent.  Patented April 6, 1909.

Application filed April 28, 1908. Serial No. 429,793.

*To all whom it may concern:*

Be it known that I, JACOB R. DONNENWORTH, a citizen of the Dominion of Canada, residing at Lacombe, in the Province of Alberta and Dominion of Canada, have invented a certain new and useful Improvement in Cultivators, of which the following is a specification.

My invention relates to a new and useful improvement in cultivators, and has for its object to provide an exceedingly simple and effective device of this character by means of which the ground will be broken, old roots, weeds, corn-stalks and bushes etc., will be thrown to the side and formed into rows so that they may be easily gathered and burned and carted away, and for leveling the ground.

With these ends in view this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is a plan view of my improvement. Fig. 2, a side elevation thereof.

In carrying out my invention as here embodied, A, B, C and D represent the main parts of the frame which are braced or held in the position shown by means of the strips E, F and G, these being bolted to the frame; the strips H, I and J have the spring teeth K fastened thereto so that the roots etc. will be moved from one tooth to the other in the direction of the arrow, and the strips H', I' and J' also having spring steel teeth fastened thereto are set at the opposite angle so that the roots etc. will be moved in the opposite direction to those which are moved by the teeth on H, I and J, or in the direction of the arrow drawn in close proximity to the strip I'.

The teeth on the strips J and J' are approximately twice the number of those on the remaining strips so that small pieces of trash which may pass between the teeth on the last named strips will be caught by the teeth on the strips J and J' and be gradually thrown to one side.

The cultivator has the eye-bolts L fastened to the sides of the frame, midway between the front and back thereof, and through these pass small chains M which are fastened to the extensions N on the rod O. To the rod O is fastened the lever P by means of which the cultivator may be raised or lowered, as desired. I also provide the lever P with a small lever for engagement with the ratchet teeth Q, so that the cultivator may be held in the position desired. I fasten the rod O to the axle R to which are connected the wheels S and the tongue T, and on this tongue I place a spring seat for the convenience of the driver.

The leveling device V the front end of which comes to a point has the outer ends held apart by means of the braces W. The front of the leveling device is attached to the axle by means of chains W', and to prevent it from working from one side to the other I provide long hooks Y and Z, one end of which is attached to said leveling device and the opposite end to the axle or frame of the cultivator.

The leveling attachment is generally used on land where there is little or no trash, and in such a place the teeth would break the ground and the leveler would level it, thus making a good looking and well cultivated field, and it will be readily seen that when the leveler is not needed it may be easily detached.

Of course I do not wish to be limited to the exact construction here shown, as slight modifications could be made without departing from the spirit of my invention.

Having thus fully described my invention what I claim as new and useful is—

1. In combination, a frame, comprising front, rear and side pieces secured together, braces E, F, and G secured to the frame, strips H, H', I, I', J and J' secured diagonally across the under side of the frame, spring steel teeth fastened to said strips, eye bolts attached to the sides of the frame mid-way between the front and rear ends thereof, an axle having wheels journaled on the ends thereof, a rod movably secured to the axle having extensions formed therewith, chains connected to the extensions of said rod and to the eye bolts, and means for turning the rod, as and for the purpose set forth.

2. The combination of a frame comprising front, rear and side pieces secured together, braces E, F, and G secured to the side pieces of said frame, diagonal strips H, H', I, I', J and J' attached to the frame, spring steel teeth secured to said diagonal strips, the rod O having the extensions N formed therewith, short chains connected to the extensions and the harrow frame, an axle R having wheels S formed on the ends thereof to which is movably secured the rod O with the leveler V detachably secured to the axle R, as shown and described.

In testimony whereof, I have hereunto affixed my signature in the presence of two subscribing witnesses.

JACOB R. DONNENWORTH.

Witnesses:
JOHN McKENTY,
JOHN RATHJE.